United States Patent
Croyle et al.

(10) Patent No.: US 6,308,134 B1
(45) Date of Patent: Oct. 23, 2001

(54) VEHICLE NAVIGATION SYSTEM AND METHOD USING MULTIPLE AXES ACCELEROMETER

(75) Inventors: Steven R. Croyle, Franklin; Larry E. Spencer, II, Lake Orion; Ernie R. Sittaro, Romero, all of MI (US)

(73) Assignee: Magellan DIS, Inc., Rochester Hills, MI (US)

( * ) Notice: Subject to any disclaimer, the term of this patent is extended or adjusted under 35 U.S.C. 154(b) by 0 days.

(21) Appl. No.: 09/091,430

(22) PCT Filed: Dec. 27, 1996

(86) PCT No.: PCT/US96/20848

§ 371 Date: Nov. 30, 1998

§ 102(e) Date: Nov. 30, 1998

(87) PCT Pub. No.: WO97/24582

PCT Pub. Date: Jul. 10, 1997

(51) Int. Cl.$^7$ ........................................... G06G 7/78
(52) U.S. Cl. .................. 701/220; 701/213; 701/214; 701/216; 701/221; 701/200; 340/723; 340/995; 340/990; 343/450; 343/451
(58) Field of Search ..................... 701/220, 207, 701/1; 364/454; 235/150.27

(56) References Cited

U.S. PATENT DOCUMENTS

| | | |
|---|---|---|
| 3,442,140 | 5/1969 | Pelteson . |
| 3,492,465 | 1/1970 | Buscher et al. . |

(List continued on next page.)

FOREIGN PATENT DOCUMENTS

3242904 A1   11/1982   (DE) .

3912108   4/1989   (DE) .

(List continued on next page.)

OTHER PUBLICATIONS

Brochure: Fleet–Trak: Fleet Management System.
McLellan, et al., Applicaiton of GPs Positioning to Management of Mobile Operations, pp. 1–16; 1991.

(List continued on next page.)

*Primary Examiner*—William A. Cuchlinski, Jr.
*Assistant Examiner*—Tuan C To
(74) *Attorney, Agent, or Firm*—Carlson, Gaskey & Olds

(57) ABSTRACT

The improved vehicle navigation system uses a multiple, orthogonal axes accelerometer, such as two or three accelerometers which are mounted orthogonal to one another. The two axes whose acceleration are to be measured are the longitudinal (nose to rear bumper) axis and lateral (left to right side) axis. The tangential or longitudinal axis acceleration is integrated once to obtain longitudinal speed and is integrated again to produce a vehicle displacement. The lateral accelerometer measures the centripetal force that the vehicle is encountering which is used to compute a centripetal or lateral acceleration. The lateral acceleration is used to obtain a heading change derived from the lateral acceleration information and the longitudinal speed. Using the heading change and the longitudinal acceleration, the improved vehicle navigation system propagates a previous position to a current position. This is accomplished without the need for connection to the vehicle speed sensor and the heading sensor. If a third axis acceleration measurement sensor is used the improved vehicle navigation system can operate completely independent of vehicle sensors, further increasing flexibility in mounting. The third accelerometer provides pitch to assist in calibrating the other accelerometers or other sensors and in altering the longitudinal and/or lateral acceleration information by, for example, detecting a banked turn.

20 Claims, 10 Drawing Sheets

U.S. PATENT DOCUMENTS

| | | | |
|---|---|---|---|
| 3,588,478 | * 6/1971 | Anthony | 235/150.27 |
| 3,597,598 | 8/1971 | McAllister . | |
| 3,610,900 | 10/1971 | Talwani . | |
| 3,702,477 | 11/1972 | Brown . | |
| 3,749,893 | 7/1973 | Hileman | 235/150.27 |
| 3,803,387 | 4/1974 | Lackowski . | |
| 3,845,289 | 10/1974 | French | 235/151.2 |
| 3,924,824 | 12/1975 | Brodie et al. . | |
| 3,984,806 | 10/1976 | Tyler | 340/23 |
| 4,032,758 | 6/1977 | Lewis | 235/150.2 |
| 4,038,527 | 7/1977 | Brodie et al. . | |
| 4,070,674 | 1/1978 | Buell et al. . | |
| 4,086,632 | 4/1978 | Lions | 364/444 |
| 4,107,689 | 8/1978 | Jellinek | 343/112 TC |
| 4,135,155 | 1/1979 | Kehl et al. . | |
| 4,173,784 | 11/1979 | Health et al. . | |
| 4,253,150 | 2/1981 | Scovill | 364/449 |
| 4,254,465 | 3/1981 | Land | 364/453 |
| 4,262,861 | 4/1981 | Goldstein . | |
| 4,301,506 | 11/1981 | Turco | 364/436 |
| 4,312,577 | 1/1982 | Fitzgerald | 353/12 |
| 4,351,027 | 9/1982 | Gay et al. | 364/432 |
| 4,369,441 | 1/1983 | Wohlmuth | 340/733 |
| 4,403,291 | 9/1983 | Von Tomkewitsch | 364/424 |
| 4,483,357 | 11/1984 | Evans et al. . | |
| 4,504,913 | 3/1985 | Miura et al. | 364/449 |
| 4,513,377 | 4/1985 | Hasebe et al. | 364/449 |
| 4,528,552 | 7/1985 | Moriyama et al. | 340/525 |
| 4,543,572 | 9/1985 | Tanaka et al. | 340/723 |
| 4,546,439 | 10/1985 | Gene Esparza | 364/444 |
| 4,571,684 | 2/1986 | Tachi et al. | 364/444 |
| 4,608,656 | 8/1986 | Tanaka et al. | 364/449 |
| 4,646,089 | 2/1987 | Takanabe et al. | 340/995 |
| 4,660,037 | 4/1987 | Nakamura | 340/990 |
| 4,675,676 | 6/1987 | Takanabe et al. | 340/995 |
| 4,692,765 | 9/1987 | Politis et al. . | |
| 4,713,767 | 12/1987 | Sato et al. . | |
| 4,758,959 | * 7/1988 | Thoone et al. | 364/454 |
| 4,796,191 | 1/1989 | Honey et al. | 364/450 |
| 4,800,501 | 1/1989 | Kinsky . | |
| 4,814,989 | 3/1989 | Dobereiner et al. | 364/444 |
| 4,819,175 | 4/1989 | Wuttke | 364/449 |
| 4,823,626 | 4/1989 | Hartmann et al. . | |
| 4,847,769 | 7/1989 | Reeve | 364/424.02 |
| 4,870,588 | 9/1989 | Merhav . | |
| 4,890,104 | 12/1989 | Takanabe et al. | 340/995 |
| 4,899,285 | 2/1990 | Nakayama et al. | 364/453 |
| 4,930,085 | 5/1990 | Kleinschmidt . | |
| 4,949,268 | 8/1990 | Nishikawa et al. | 364/449 |
| 4,989,151 | 1/1991 | Nuimura | 364/449 |
| 5,001,647 | 3/1991 | Rapiejko et al. . | |
| 5,014,205 | 5/1991 | Sindlinger et al. | 364/449 |
| 5,023,798 | 6/1991 | Neukirchner et al. | 364/449 |
| 5,046,011 | 9/1991 | Kakihara et al. | 364/449 |
| 5,058,023 | 10/1991 | Kozikaro | 364/450 |
| 5,075,693 | 12/1991 | McMillian et al. | 342/457 |
| 5,109,344 | 4/1992 | Kakihara et al. | 364/449 |
| 5,111,209 | 5/1992 | Toriyama | 342/357 |
| 5,119,102 | 6/1992 | Barnard | 342/357 |
| 5,166,882 | 11/1992 | Stambaugh . | |
| 5,172,323 | 12/1992 | Schmidt . | |
| 5,185,610 | 2/1993 | Ward et al. | 342/357 |
| 5,233,844 | 8/1993 | Mansell et al. | 342/357 |
| 5,276,451 | 1/1994 | Odagawa | 342/357 |
| 5,278,424 | 1/1994 | Kagawa | 250/561 |
| 5,301,114 | 4/1994 | Mitchell . | |
| 5,301,130 | 4/1994 | Alcone et al. . | |
| 5,311,195 | 5/1994 | Mathis et al. | 342/357 |
| 5,337,243 | 8/1994 | Shibata et al. | 364/449 |
| 5,339,684 | 8/1994 | Jircitano et al. . | |
| 5,355,316 | 10/1994 | Knobbe . | |
| 5,367,463 | 11/1994 | Tsuji | 364/449 |
| 5,383,127 | 1/1995 | Shibata | 364/449 |
| 5,442,560 | 8/1995 | Kau . | |
| 5,450,345 | 9/1995 | Raymer et al. . | |
| 5,479,161 | 12/1995 | Keyes et al. . | |
| 5,526,263 | 6/1996 | Tanaka et al. . | |
| 5,531,115 | 7/1996 | Erdley . | |
| 5,570,304 | 10/1996 | Mark et al. . | |
| 6,029,111 | * 2/2000 | Croyle | 701/207 |
| 6,038,495 | * 3/2000 | Schiffmann | 701/1 |

FOREIGN PATENT DOCUMENTS

| | | |
|---|---|---|
| 0 059 435 | 9/1982 | (EP) . |
| 0 061 564 1 | 10/1982 | (EP) . |
| 0 069 965 | 1/1983 | (EP) . |
| 0 103 847 | 3/1984 | (EP) . |
| 0110 171 | 6/1984 | (EP) . |
| 0 118 886 | 9/1984 | (EP) . |
| 0 471 405 | 2/1992 | (EP) . |
| 0 496 538 | 7/1992 | (EP) . |
| 0 514 887 | 11/1992 | (EP) . |
| 0 544 403 | 6/1993 | (EP) . |
| 0 567 268 | 10/1993 | (EP) . |
| 1 470 694 | 4/1977 | (GB) . |
| 2 014 309 | 8/1979 | (GB) . |
| 2144 007 | 2/1985 | (GB) . |
| 2 115 946 | 9/1993 | (GB) . |
| 59-28244 | 10/1957 | (JP) . |
| 57-158875 | 9/1982 | (JP) . |
| 58-27008 | 2/1983 | (JP) . |
| 58-111969 | 7/1983 | (JP) . |
| 58-113711 | 7/1983 | (JP) . |
| 58-178213 | 10/1983 | (JP) . |
| 60-135817 | 7/1985 | (JP) . |
| WO 92/10824 | 6/1992 | (WO) . |

OTHER PUBLICATIONS

Stanley K. Honey; A Novel Approach to Automotive Navigation and Map Display, pp. 40–43.

Siemens, Ali–Scout System;.

G. C. Larson; Evaluation of an AVM System Implemented City–Wide in St. Louis. pp. 378–383.

Brochure: NavTrax 1000 Fleet Management System.

Lezniak, et. al.; A Dead Reckoning/Map Correlation System for Automatic Vehicle Traking; pp. 47–60.

May, 1973; Vehicular technology; Antartic Navigation; pp. 36–41.

R. L. French; MAP Matching Origins Approaches and Applications; pp. 91–116.

Sep. 1974; R. L. Fey; Automatic Vehicle Location Techniques for Law Enforcement Use; pp. 1–22.

Tsumura, An Experiment System for Automatic Guidance of Ground Vehicle Following the Commanded Guidance Route on Map, pp., 2425–2430.

Totani et. al.; Automotive Navigation System; pp. 469–477.

K. Mitamura et. al.; SAE Technical Paper Series; The Friver Guide System; pp. 1–9.

Thoone; Carin, a car information and navigation system; Philips Technical Review; vol. 43, No. 11/12, Dec. 1987; pp. 317–329.

T. Tsumura, et. al.; A System for Measuring Current Position and/or Heading of vehicles; pp. 3–8.

Edward N. Skomal; Automatic Vehicle Locating System; pp. 1–12, 65–98, 319–320.

Agard; No. 176; Medium Accuracy Low Cost Navigation; pp. 28–1 to 28–31.

K. Tagami; et. al.; New Navigaiton Technology to Advance Utilizationof Passenger Cars; pp. 413–422.

Tagami et. al.; SAE Technical Paper Series; "Electro Gyro–Cator" New Inertial Navigation System etc; pp. 1–15.

Agard; W. M. Aspin Comed– A Combined Display Including a Full Electronic Facility etc.; pp. 30–1 to 30–11.

Evan; Chrysler Laser Atlas Satellite System (C.L.A.S.S.).pp. 1–31.

R. L. French; The Evolution of Automobile Navigation in Japan, Jun. 21–23, 1993.

R. L. French, et al.; A Comparison of IVHS Progress in the United States, Japan and Europe.etc. 3/94 pp. 17–22.

M. Shibita; et al; Curent Status and Future Plans for Digital Map Databases in Japan; 10/93 pp. 29–33.

Itoh, The Development of the Drive Guide System (japanese with English summary). 1989.

Business Week Magazine; Space–age Navigation for the Family Car; pp. 82–84, 1984.

Journal; Nissan Technical Review; The Develpment of a New Multi–A V System, 1991.

Buxton, et al., The Travelpilot: A Second–Generation Automative Navigation System, 1991.

Pilsak, Eva–An Electronic Traffic Pilot for Motorists, 1986.

French, The Evolving Roles of Vehicular Navigation, 1987, pp. 212, 216.

Claussen, et al.; Status and Directions of Digital Map Databases in Europe; 1993, pp. 25–28.

Jarvis, et al., Cathode–Ray Tube Information Center with Automotive Navigation, pp. 123–137.

Dork, Satellite Navigation Systems for Land Vehicles; 1987, pp. 2–5.

French, Automobile Navigation: Where is it Going? 1987, pp. 6–12.

LaHaije, et al., Efficient Road–Map Management for a Car Navigation System, pp. 477–491.

French, et al., Automative Route Control System; 1973, pp. 36–41.

Tsumura, et al., Automatic Vehicle Guidance—Commanded Map Routing, pp. 62–67.

Sugie, et al., CARGuide—on–board computer for automobile route guidance, pp. 695–706.

McLellan, et al., Fleet Mangement Trials in Western Canada; pp. 797–806.

Skomal, Comparative Analysis fo Six Commercially Available System; pp. 34–45.

Krause, et al. Veloc—A Vehicle Location and Fleet Management System.

Dittloff, et al., Veloc—A New Kind of Information System; pp 181–187; 1992.

Article: Vehicle Positioning High Level map Matching Design Document; pp. 1–25; 195.

Brown, Low Cost Vehicle Location and Tracking using GPS; 1992.

* cited by examiner

VEHICLE NAVIGATION SYSTEM AND METHOD USING MULTIPLE AXES ACCELEROMETER

This application is a 371 of PCT/US96/20848, filed Dec. 27, 1996, which claims priority to U.S. Ser. No. 08/580,177, filed Dec. 28, 1995, now abandoned.

FIELD OF THE INVENTION

The present invention relates generally to vehicle navigation systems using accelerometers. More particularly, the present invention relates to an improved vehicle navigation system and method using multiple accelerometers mounted orthogonally to each other or an orthogonal axes accelerometer.

BACKGROUND OF THE INVENTION

Accelerometers have been used in airborne navigation systems in the past, but only in conjunction with gyros. The current route guidance and navigation systems that exist for automobiles today use the vehicle speed signal, rate gyro and a reverse gear hookup to "dead reckon" the vehicle position from a previously known position. This method of dead reckoning, however, is susceptible to sensor error, and therefore requires more expensive sensors for accuracy and dependability.

The systems that use odometers, gyros and reverse gear hookups also lack portability due to the required connections to odometers and the frailty of gyros. Moreover, these systems are hard to install in different cars due to differing odometer configurations which can have different connections and pulse counts in the transmission. Odometer data also varies with temp, load weight, tire pressure, speed. Alternative connections to cruise control or ABS sensors bring up safety concerns. This reduces the installation flexibility, increases installation costs and reduces the portability of the vehicle navigation system. Accordingly, there is a need for a vehicle navigation system with more freedom of installation which is portable and accurately determines vehicle position.

SUMMARY OF THE INVENTION

The improved vehicle navigation system is smaller, more cost effective, potentially portable and allows for more freedom of installation. In certain embodiments, the zero motion detection system takes advantage of the recent availability of low cost micro-machined accelerometers.

The improved vehicle navigation system uses an orthogonal axes accelerometer, such as two or three accelerometers, which are mounted orthogonal to one another. The system can measure acceleration in the longitudinal (nose to rear bumper) axis and lateral (left to right side) axis. The tangential or longitudinal axis acceleration is integrated once to obtain longitudinal speed and is integrated again to produce a vehicle displacement. The lateral accelerometer measures the centripetal force that the vehicle is encountering which is used to compute a centripetal or lateral acceleration. The lateral acceleration is used to obtain a heading change derived from the lateral acceleration information and the longitudinal speed. Using the heading change and the longitudinal acceleration, the improved vehicle navigation system propagates a previous position to a current position. This is accomplished without the need for connection to the vehicle speed sensor and the heading sensor. If a third axis acceleration measurement sensor is used, the improved vehicle navigation system can operate completely independent of vehicle sensors, further increasing flexibility in mounting. The third accelerometer provides pitch to assist in calibrating the other accelerometers or other sensors and in altering the longitudinal and/or lateral acceleration information by, for example, detecting a banked turn.

BRIEF DESCRIPTION OF THE DRAWINGS

Other aspects and advantages of the present invention may become apparent upon reading the following detailed description and upon reference to the drawings in which:

FIG. 4b shows a flow chart for the operation of the zero motion detect system of FIG. 4a;

Figure 1:
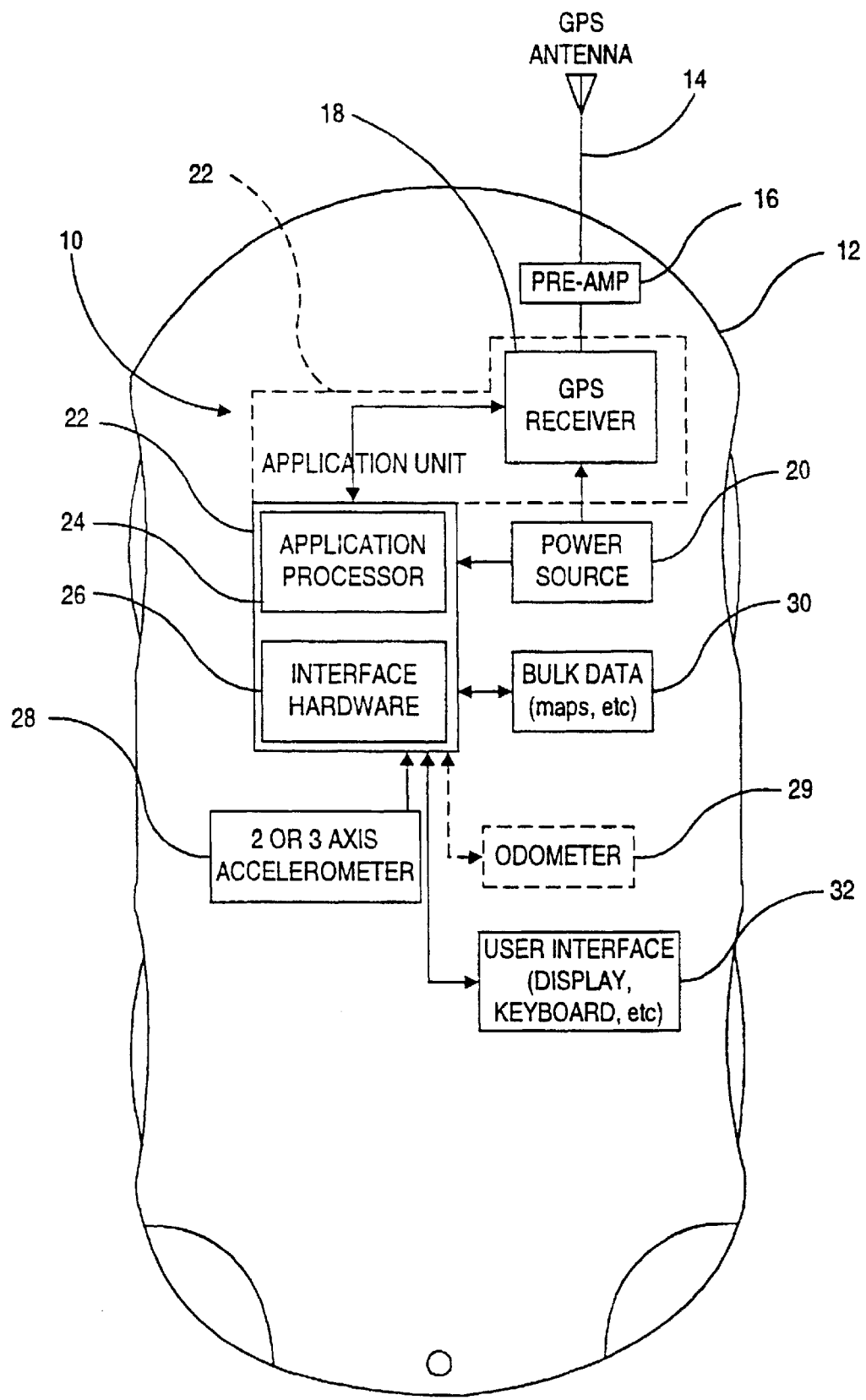
FIG. 1 shows an improved vehicle navigation system according to the principles of the present invention.

While the invention is susceptible to various modifications and alterative forms, specifics thereof have been shown by way of example in the drawings and will be described in detail. It should be understood, however, that the intention is not to limit the invention to the particular embodiment described. On the contrary, the intention is to cover all modifications, equivalents, and alternatives falling within the spirit and scope of the invention as defined by the appended claims.

DETAILED DESCRIPTION OF THE DRAWINGS

An illustrative embodiment of the improved position determination system according to the principles of the present invention and methodology is described below as it might be implemented using orthogonally mounted accelerometers to determine a current position from a previous position. In the interest of clarity, not all features of an actual implementation are described in this specification. It will of course be appreciated that in the development of any such actual implementation (as in any development project), numerous implementation-specific decisions must be made to achieve the developers' specific goals and subgoals, such as compliance with system- and business-related constraints, which will vary from one implementation to another. Moreover, it will be appreciated that such a development effort might be complex and time-consuming, but would nevertheless be a routine undertaking of device engineering for those of ordinary skill having the benefit of this disclosure.

The improved vehicle navigation system can be used in a variety of configurations as would be understood by one of ordinary skill in the art. Such a vehicle navigation system is disclosed in copending patent application Ser. No. 08/580,150, entitled "Improved Vehicle Navigation System And Method" and filed concurrently with this application. Particular embodiments of the improved vehicle navigation system uses GPS, such as an electromagnetic wave positioning system. Such a GPS system is the Navigation Satellite Timing and Ranging (NAVSTAR) Global Positioning System. GPS includes NAVSTAR GPS and its successors, Differential GPS (DGPS), or any other electromagnetic wave positioning systems. NAVSTAR GPS receivers provide users with continuous three-dimensional position, velocity, and time data.

FIG. 1 illustrates, in block diagram form, an exemplary arrangement and use of an improved vehicle navigation system 10 for an automobile 12. In this embodiment, the improved vehicle navigation system 10 uses a GPS antenna 14 to receive the GPS signals. The antenna 14 is preferably of right-hand circular polarization, has a gain minimum of −3 dBiC above 5 degree elevation, and has a gain maximum of +6 dBiC. Patch or Helix antennas matching these specifications can be used. The GPS antenna 14 can be connected to a preamplifier 16 to amplify the GPS signals received by the antenna 14. The pre-amplifier 16 is optional, and the GPS antenna can be directly connected to a GPS receiver 16.

The GPS receiver 18 continuously determines geographic position by measuring the ranges (the distance between a satellite with known coordinates in space and the receiver's antenna) of several satellites and computing the geometric intersection of these ranges. To determine a range, the receiver 18 measures the time required for the GPS signal to travel from the satellite to the receiver antenna. The timing code generated by each satellite is compared to an identical code generated by the receiver 18. The receiver's code is shifted until it matches the satellite's code. The resulting time shift is multiplied by the speed of light to arrive at the apparent range measurement.

Since the resulting range measurement contains propagation delays due to atmospheric effects, and satellite and receiver clock errors, it is referred to as a "pseudorange." Changes in each of these pseudoranges over a short period of time are also measured and processed by the receiver 18. These measurements, referred to as "delta-pseudoranges," are used to compute velocity. The velocity and time data is generally computed once a second. If one of the position components is known, such as altitude, only three satellite pseudorange measurements are needed for the receiver 16 to determine its velocity and time. In this case, only three satellites need to be tracked.

As shown in FIG. 1, the GPS receiver 18 provides GPS measurements to an application unit 22. Powered via a conventional power source 20, the application unit 22 consists of application processing circuitry 24, such as a processor, memory, buses, the application software and related circuitry, and interface hardware 26. In certain embodiments of the present invention, the application unit 22 can be incorporated into the GPS receiver 18. The interface hardware 26 integrates the various components of the vehicle navigation system 10 with the application unit 22. In this embodiment, a 2 or 3 orthogonal axis accelerometer 28 provides acceleration signals to the application unit 22. An odometer 29 provides information which can be used in place of the information derived from the accelerometer, but the odometer 29 is optional because it reduces the portability of the system. A map database 30 stores map information, such as a road network, and provides map information to the application unit 22. A user interface 32, which includes a display and keyboard, allows interaction between the user and the improved vehicle navigation system 10.

Figure 2:
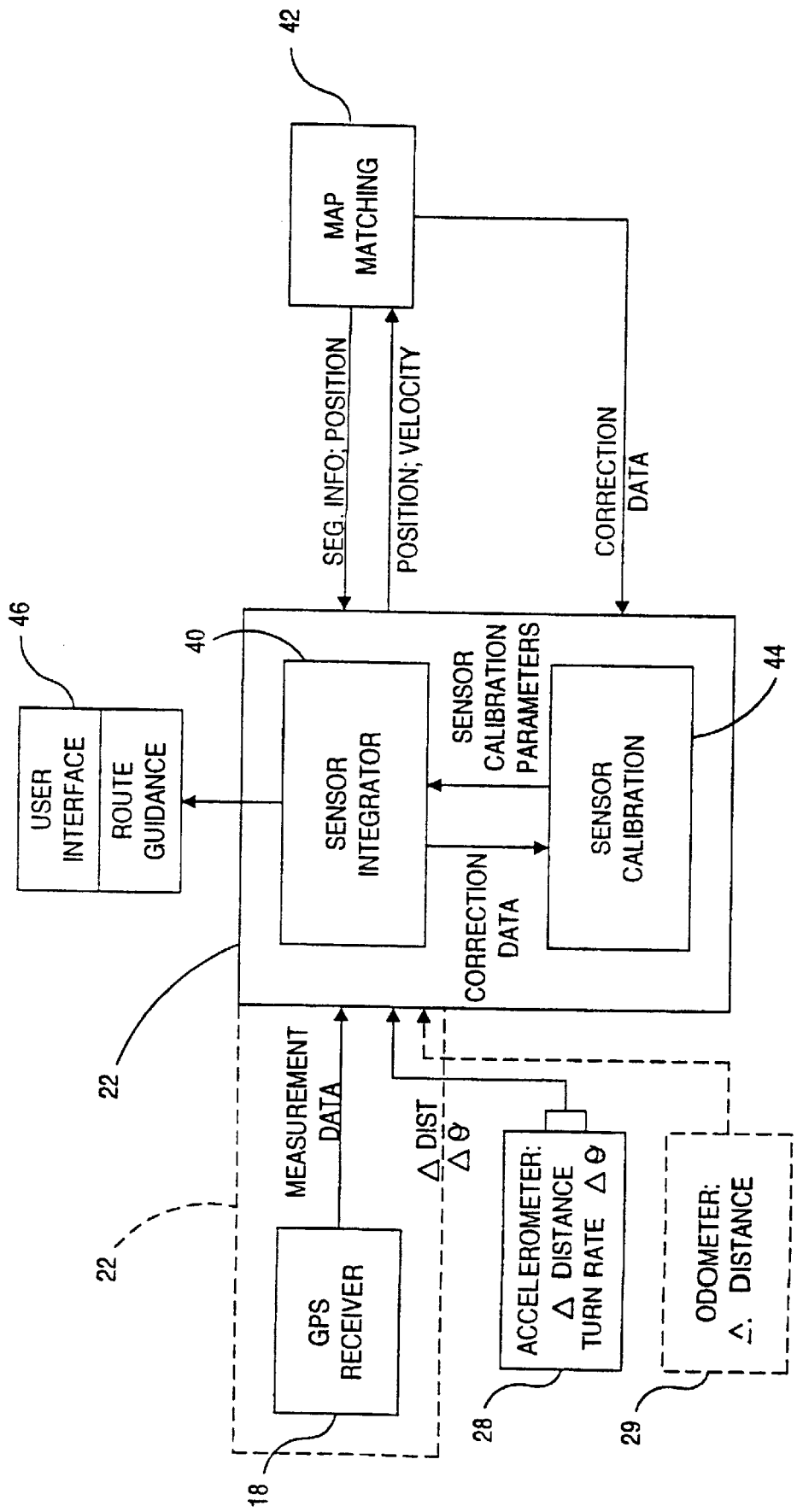
FIG. 2 shows a block/data flow diagram of the improved vehicle navigation system of FIG. 1.

FIG. 2 shows a more detailed block and data flow diagram for the improved vehicle navigation system 10 of FIG. 1.

The GPS receiver 18 provides position information, velocity information, pseudoranges and delta pseudoranges to the sensor integrator 40. The sensor integrator 40 uses the velocity information to determine a current position for the vehicle. In this embodiment, if GPS velocity information is not available, the sensor integrator 40 can calculate GPS velocity using the available delta range measurements to determine a current position. GPS velocity information is derived from a set of delta range measurements, and if only a subset of delta range measurements is available, the vehicle navigation system can derive GPS velocity information from the subset of delta range measurements. The vehicle navigation system uses the GPS position information at start-up as a current position and during other times of operation as a check against the current position. If the current position fails the check, then the GPS position can replace the current position.

When GPS velocity information is available and reliable, the application processor 22 propagates the position vector $\vec{x}(t)$ with the GPS velocity vector $\vec{v}_G$ as follows: $\vec{x}(t) = \vec{x}(t-1) + \vec{v}_G \Delta t$. If the difference between the GPS heading and the map heading is within a threshold, the map heading is used as the heading. If the GPS velocity information is not available or unreliable (at low velocities below 1.5 m/s), the vehicle positioning information will propagate the position vector $\vec{x}(t)$ using the available velocity vector with the most merit as follows: $\vec{x}(t) = \vec{x}(t-1) + \vec{v} \Delta t$.

In the particular embodiment, the improved vehicle navigation system can propagate the vehicle position from the available information, such as GPS delta range measurement(s), the GPS velocity, or the orthogonal axes accelerometer using lateral and longitudinal acceleration information. Application processor 22 calibrates $\vec{v}_a$ from $\vec{v}_G$ when possible. The GPS position information is used as an overall check on the current position. For example, if $|\vec{x}(t) - \vec{x}_G(t)| < (18.5 * PDOP)$, where PDOP is the "position dilution of precision" a common variable computed automatically in the GPS engine, then $\vec{x}(t)$ is left unchanged, i.e. $\vec{x}(t) = \vec{x}(t)$. Otherwise, $\vec{x}(t) = \vec{x}_G(t)$. In certain embodiments, all raw inputs could go into a Kalman filter arrangement which outputs the velocity vector.

Figure 3A:
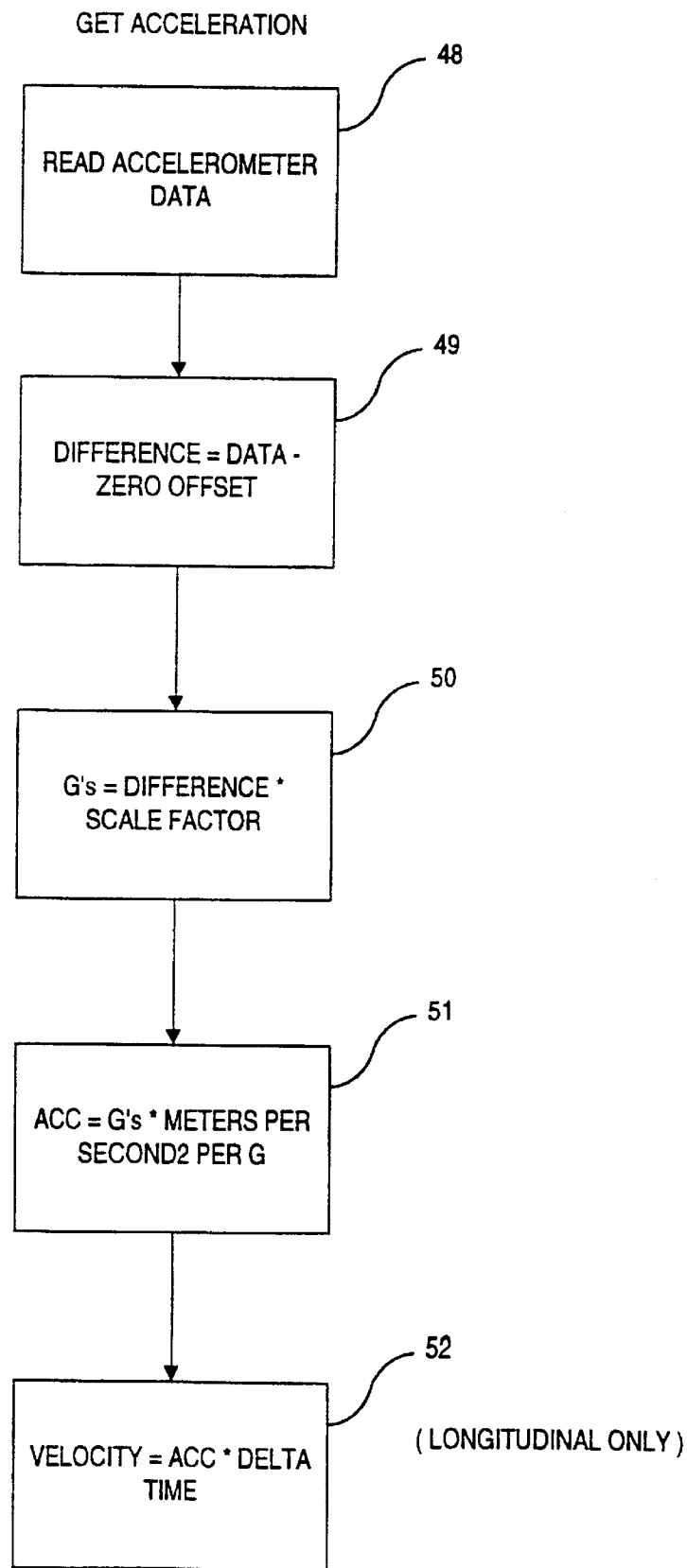
FIGS. 3a and 3b show flow charts for gathering acceleration information and orienting the multiple axis accelerometer.
Figure 3B:
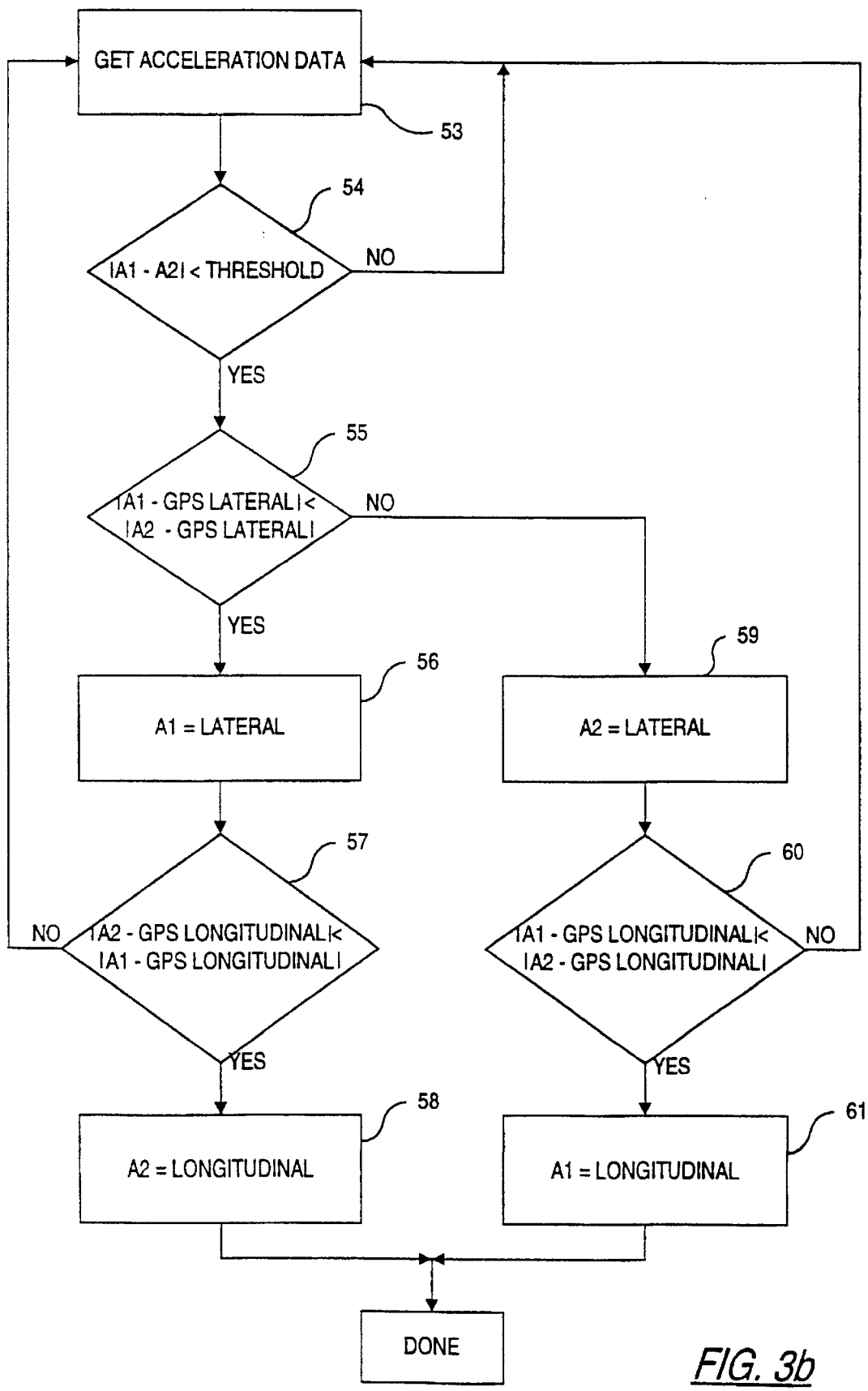

The sensor 28 for the embodiment of FIG. 2, which is a multiple, orthogonal axis accelerometer, provides acceleration information for at least two orthogonal axes (lateral, longitudinal and/or vertical). The accelerometers 28 produce a voltage measure. As shown in FIG. 3a for the longitudinal accelerometer although a similar flow chart applies to each orthogonal axis, the accelerometer data is read at step 48, and the zero offset (set at the factory and constantly re-checked and reset by the Zero Motion Detector mentioned below) is subtracted from this measure at step 49 to produce a number of volts displacement from zero. This number of volts displaced from zero is then multiplied by a scale factor (set at the factory and continuously re-calibrated by the GPS) to produce a number of G's of acceleration at step 50. This number of G's of acceleration is then multiplied by the number of meters per second squared per G to produce meters per second squared of acceleration at step 51. The meters per second squared of acceleration is then multiplied by the delta time (integrated once) to produce a velocity at step 52. This velocity is saved for the next second. This acceleration information can be used to determine change in distance information, $\Delta DIST$, and change in turn information, $\Delta \Theta$.

Initially, the improved vehicle navigation system requires initial conditions for various items, such as accelerometer orientations, accelerometer zero offsets and accelerometer scale factors. Factory defaults that will be used for each of these items so that no initialization will be necessary. Those items will also need to be maintained, but not necessarily in the absence of all power (i.e. battery loss, or removal from vehicle). An option will be available to manually initialize these items. This would allow immediate use of the system, without having to wait for GPS to be acquired for calibrating these items.

Once GPS has been acquired and is determined to be useable, GPS can be used to calibrate all of the configurable items. It will first determine the accelerometer orientations as described in FIG. 3c. At power on, the assignment of accelerometers to each of the lateral, longitudinal and down axes (if three axis accelerometer is used) are in the same orientation as the last power down, which will be saved in some non-volatile storage. If three accelerometers are used, one will be measuring the Earth's gravity. The accelerometer measuring one G (Earth's Gravity) will be assigned to the Down Axis. For the other two axes, as shown in FIG. 3c, the following procedure will take place. At step 53, the acceleration data is obtained as described in FIG. 4b. The acceleration measurements from each of the two accelerometers will be compared until their difference reaches a pre-defined threshold at step 54. The reason for this is to ensure that the accelerations are uneven enough that a valid compare against current vehicle conditions can be made without ambiguity.

As shown in steps 55–61 for this particular embodiment, once this situation occurs and there is acceleration data computed from the GPS data, the acceleration from each of the accelerometers will be compared to the lateral and longitudinal accelerations computed from the GPS and the accelerometers with the closest acceleration values for each of those axes will be assigned to those axes. Additionally, the initial vehicle orientation is determined because the vehicle heading relative to True North can be computed from the GPS velocities.

With reference to FIG. 2, the sensor integrator 40 can use the longitudinal and lateral acceleration information as described below to determine a current position for the vehicle if GPS velocity information is not available. In any event, if GPS is available or not, the sensor integrator 40 provides the current position and a velocity (speed and heading) to a map matching block 42. The map matching block 42 provides road segment information for the road segment that the vehicle is determined to be travelling on, such as heading, and a suggested position. The sensor integrator 40 can update the heading component of the velocity information with the heading provided by the map matching block 42 to update the current position. If the map matching block 42 indicates a good match, then the map matched position can replace the current position. If not, the sensor integrator 40 propagates the previous position to the current position using the velocity information. As such, the sensor integrator 40 determines the current position and provides the current position to a user interface and/or route guidance block 46.

The map matching block 42 also provides correction data, such as a distance scale factor and/or offset and a turn rate scale factor and/or offset, to a sensor calibration block 44. The sensor integrator 40 also provides correction data to the sensor calibration block 44. The correction data from the sensor integrator 40, however, is based on the GPS information. Thus, accurate correction data based on the GPS information is continuously available to calibrate the sensors 28 (2 or 3 axis accelerometer) as well as for other sensors depending on the particular embodiment. The correction data from the map matching block may be ignored by the sensor calibration block 44 until a good match is found between the map information and the current position. If a highly accurate match is found by map matching 42, most likely after a significant maneuver such as a change in direction, the map matched position is used as a reference point or starting position for position propagation according to the principles of the present invention.

The sensor calibration block 44 contains the sensor calibration parameters, such as scale factors and zero factors for the sensors 28 and 29 and provides the calibration parameters to the sensor integrator 40 to calibrate the sensors 28 and 29. In one embodiment, the system can combine the sensor integrator 40 and sensor calibration 44 into GPS engine 18 using its processor. In certain embodiments, the route guidance and user interface, the sensor integrator 40 and the sensor calibration 44 is performed on an application specific integrated circuit (ASIC).

If the accuracy of a current position is determined to be high (for example, a map matched position at a isolated turn), the improved vehicle navigation system 10 can update the current position with the known position. After the vehicle has moved a distance from the known position which is now a previous position, the improved vehicle navigation system must accurately propagate the vehicle position from the previous position to the current position.

The calculations that will be performed to compute the vehicle position will take place in three coordinate frames. The vehicle position will be reported in geodetic coordinates (latitude, longitude, altitude). The non-GPS data will be provided in body or platform coordinates. The GPS velocities and the equations used for velocity propagation of position will take place in the North, East, Down frame.

The geodetic frame is a representation of the Earth Centered Earth Fixed (ECEF) coordinates that is based on spherical trigonometry. This is the coordinate frame that the mapping database uses. Its units are degrees and meters displacement in height above the geoid. These coordinates will be with respect to the WGS-84 Earth model, which is the Earth model used by the Global Positioning System (GPS). This is mathematically equivalent to the North American Datum 1983 (NAD 83) system which the mapping database is referenced to. The North East Down frame is a right-handed orthonormal coordinate system fixed to the vehicle with its axes pointing to the True North, True East, and True Down (perpendicular to the Earth) directions. The body coordinates form a right-handed orthonormal coordinate system with their origin at the navigation unit, the x axis pointing toward the nose of the vehicle, the right axis pointing out the right door of the vehicle and the z axis pointing down perpendicular to the Earth.

During normal operation of this particular embodiment, and with GPS available, the following are the equations that will be used for computing the vehicle position and the calibration of the accelerometers and odometer.

Definitions:

$\vec{x}$ = position vector [latitude longitude altitude]

$\dot{\vec{x}}$ = velocity vector [north east down]

$\ddot{\vec{x}}$ = acceleration vector [north east down]

$C_N^B$ = Transformation matrix which rotates a vector from the Body coordinate frame to the North East Down coordinate frame.

The following superscripts will be used to denote the origin of the data:

G=GPS

A=Accelerometer

The following subscripts will denote time—either time of validity or time period of integration:

t=current time t−1=time of last data set before the current data set t−2=time of data set before t−1

Note that t−1 and t−2 do not necessarily imply a one second difference, but only data collection and/or data validity times.

The following subscripts will denote coordinate reference frames:

N=North East Down

B=Body (Nose Right Door Down)

G=Geodetic (latitude longitude height)

To use the information from the non-GPS sensors, their data needs to be rotated from the body frame to the North East Down frame. This is a rotation about the yaw axis measured in degrees from True North to the Nose Axis of the vehicle. The equations for this is:

$$\vec{x}^N = C_N^B(\vec{x}^B)$$

The steady state position propagation equation is based on the physical definition of velocity and acceleration. The current position is equal to the previous position plus the integral of velocity plus the double integral of acceleration.

$$\vec{x}_t = \vec{x}_{t-1} + \int_{t-1}^{t} \dot{\vec{x}} \, dt + \int_{t-1}^{t} \left( \int_{t-1}^{t} \ddot{\vec{x}} \, dt \right) dt$$

The following information is collected at time t:

$$\dot{\vec{x}}_{t-1}^G$$

The velocity from GPS which was valid at the previous second. This consists of:

$\dot{x}^e$=Velocity in the True East direction (meters/second);

$\dot{x}^n$=Velocity in the True North direction (meters/second);

$\dot{x}^u$=Velocity in the Up direction (meters/second);

$$\ddot{\vec{x}}_{t-1}^G$$

The acceleration computed from GPS velocities that was valid from time t−2 to time t−1;

$\vec{x}$ The raw GPS position, and $$\ddot{\vec{x}}_t^A$$

The acceleration computed from the accelerometers which occurred from time t−1 to time t.

The following other information is available for use at time t, but was collected at a previous time:

$$\dot{\vec{x}}_{t-2}^G$$

The velocity from GPS which was valid two time units ago;

$\vec{x}_{t-1}$ The position computed at the previous time; and $$\ddot{\vec{x}}_{t-1}^A$$

The acceleration, computed from the accelerometers, from time t−2 to time t−1.

When GPS is available and has produced a valid position and velocity solution, the following equation will be used for the propagation of the vehicle position:

$$\vec{x}_t = \vec{x}_{t-1} + \int_{t-1}^{t} \dot{\vec{x}} \, dt + \int_{t-1}^{t} \left( \int_{t-1}^{t} \ddot{\vec{x}} \, dt \right) dt$$

or $$\vec{x}_t = \vec{x}_{t-1} + \left( \dot{\vec{x}}_{t-1}^G * \Delta t \right) + \left( \frac{1}{2} \ddot{\vec{x}}_t^A * (\Delta t)^2 \right) + \left( \left( \frac{1}{2} \ddot{\vec{x}}_{t-1}^G * (\Delta t)^2 \right) - \left( \frac{1}{2} \ddot{\vec{x}}_{t-1}^A * (\Delta t)^2 \right) \right)$$

This equation is: the current position is equal to the previous position plus the GPS velocity (vector) times the delta time plus the GPS acceleration from two time periods ago minus the Accelerometer acceleration from two time periods ago (a correction factor) plus the Accelerometer acceleration from the current second.

Also computed at this second are:

(1) the GPS heading 1 computed as the inverse tangent of the East and North velocities:

$$\theta = \mathrm{atan}\left( \frac{\dot{x}^e}{\dot{x}^n} \right);$$

(2) the distance from time t−1 to time t, computed from the GPS velocity valid at time t−1 and the double integration of the longitudinal Accelerometer acceleration from time t−1 to time t:

$$S = \sqrt{(x_{t-1}^e * \Delta t)^2 + (x_{t-1}^n * \Delta t)^2} + \tfrac{1}{2} \ddot{x}_t^A * (\Delta t)^2;$$

(3) the distance from time t−2 to time t−1, computed from the GPS velocity and acceleration from time t−2 to time t−1. This will be used as a calibration factor for both the Vehicle Speed Sensor and the Longitudinal accelerometer:

$$S = \sqrt{(x_{t-2}^e * \Delta t)^2 + (x_{t-2}^n * \Delta t)^2} + \tfrac{1}{2} \ddot{x}_{t-1}^G * (\Delta t)^2;$$

(4) the change in heading from time t−2 to time t−1 from the GPS heading computed at those times. This is used as a correction factor for the lateral accelerometer.

$$\Delta \theta = \theta_{t-2}^G - \theta_{t-1}^G$$

Each sensor needs to have calibrations performed on it. The calibrations will be performed using known good data from the GPS receiver 18. The GPS receiver 18 has velocity accuracy to within one meter per second. The GPS velocity information becomes less accurate in low velocity states of less than 1.5 m/s. The GPS velocity information is time tagged so that it matches a particular set of accelerometer data on a per second basis. Map matching provides correction factors, but they are based on long term trends and not directly associated with any specific time interval. Accelerometer calibration using the GPS velocities involves the following.

Lateral Accelerometer. The lateral accelerometer measures centripetal acceleration. It is used to compute turn angle from the equation: Turn angle in radians is equal to the quotient of centripetal acceleration and tangential velocity. The lateral accelerometer has two values which need to be calibrated: The zero offset and the scale factor. The zero offset is the measurement that the accelerometer outputs when a no acceleration state exists. The scale factor is the number that is multiplied by the difference between the accelerometer read value and the accelerometer zero offset to compute the number of G's of acceleration. The zero motion detect system discussed in FIGS. 5a and 5b will be used to compute the accelerometer zero offset value. The first derivative of the GPS velocities will be used to compute the scale factor calibration.

Longitudinal Accelerometer. The longitudinal accelerometer measures the acceleration along the nose/tail axis of the vehicle, with a positive acceleration being out the nose (forward) and a negative acceleration being out the rear of the vehicle. The longitudinal accelerometer has two values which need to be calibrated: The zero offset and the scale factor. The zero offset is the measurement that the accelerometer outputs when an no acceleration state exists. The scale factor is the number that is multiplied by the difference between the accelerometer read value and the accelerometer zero offset to compute the number of G's of acceleration. The first derivative of the GPS velocities will be used to compute the scale factor calibration. The zero motion detect system shown in FIGS. 4a and 4b will be used to compute the accelerometer zero offset value.

Figure 4A:
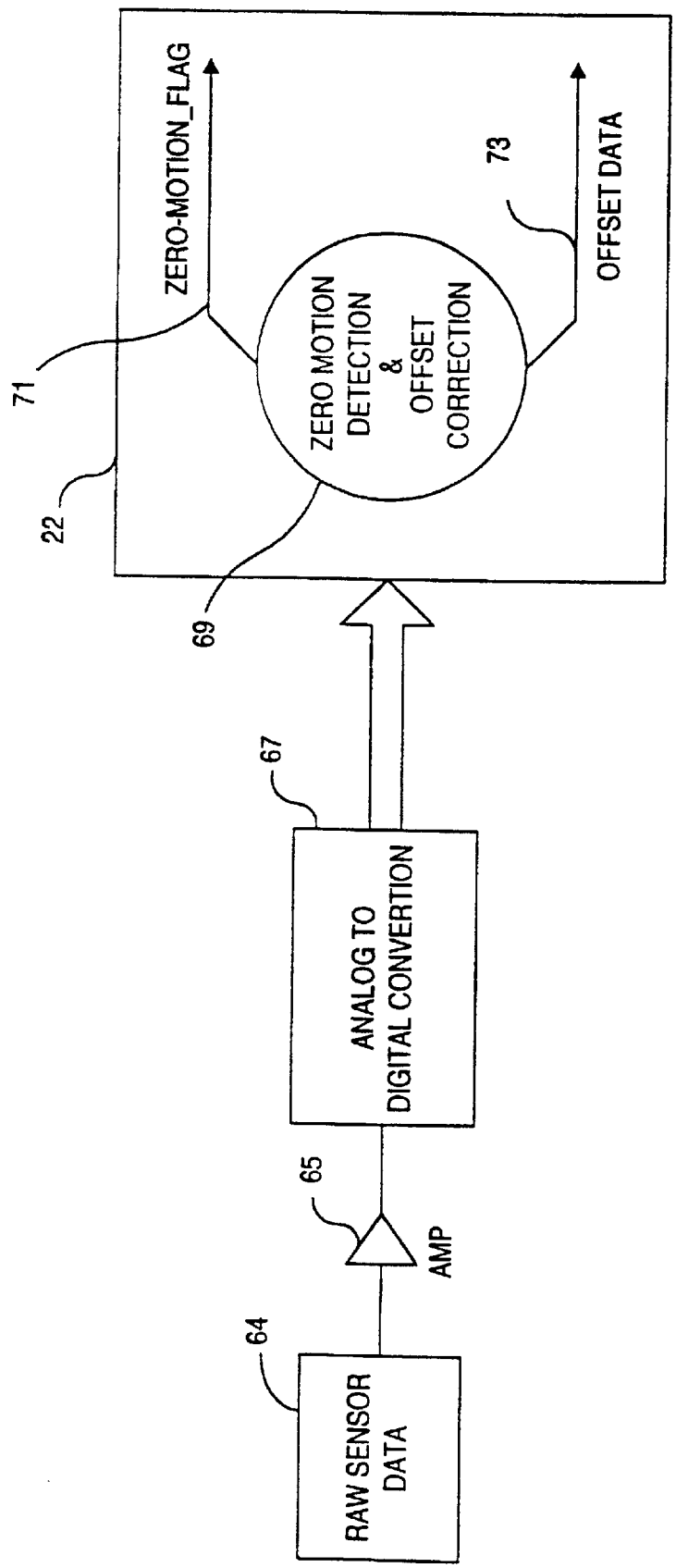
FIG. 4a shows a block diagram of a zero motion detect system according to the principles of the present invention.

FIG. 4a shows the zero motion detect system with a motion sensor 64 (an orthogonal axes accelerometer in this embodiment) providing motion signals. An amplifier 65 amplifies the motion signals, and in this particular embodiment, the motion signals are digitized in an analog to digital converter 67. The motion signals are provided to a sensor filter block 69 which is in the application unit 22 (FIG. 1). The vehicle navigation determines a zero motion state by comparing samples of the motion signals from the motion sensor 64, such as an accelerometer, a gyro, or piezoelectric sensors with a threshold (the threshold is determined by vehicle vibration characteristics for the type of vehicle that the unit is mounted in, or the threshold for motion sensor could be set using other sensors which suggest zero motion, such as odometer, GPS or DGPS). The vehicle navigation system uses at least one of the samples to determine the zero offsets if the zero motion state is detected. At least two samples are preferred to compare over a time interval and averaging those samples to obtain a zero offset for the motion sensor 64. If a zero motion state exists, the vehicle navigation system sets a zero motion flag 71 and uses at least one of the samples to determine the zero offset for the sensor providing the processed motion signals.

The system also provides offset data signals 73 which reflect the zero offset for the sensor providing the motion signals or the raw data used to calculate the zero offset. Upon detecting a zero motion state, the vehicle navigation system can resolve ambiguity of low velocity GPS measurements because the velocity is zero. GPS velocities do not go to zero, so ambiguities exist when in a low velocity state of less than 1.5 m/s. If a zero motion flag is on, then the ambiguities are resolved because the system is not moving. As such, the system freezes the heading and can also set the speed component of velocity to zero.

The following high level language program shows the operation of this particular embodiment of the zero motion detect system.

```
NUMSAMPLES = 16 (in filter array)
WORD      DATA[NUMSAMPLES-1]
WORD      NOISE
FOR (I=0; I < NUMSAMPLES; I++
      NOISE = NOISE + |DATA[I] - DATA[I+1]|
If (NOISE > THRESHOLD)
      ZERO_MOTION_FLAG = 0
ELSE
      ZERO_MOTION_FLAG = 1.
```

Figure 4B:
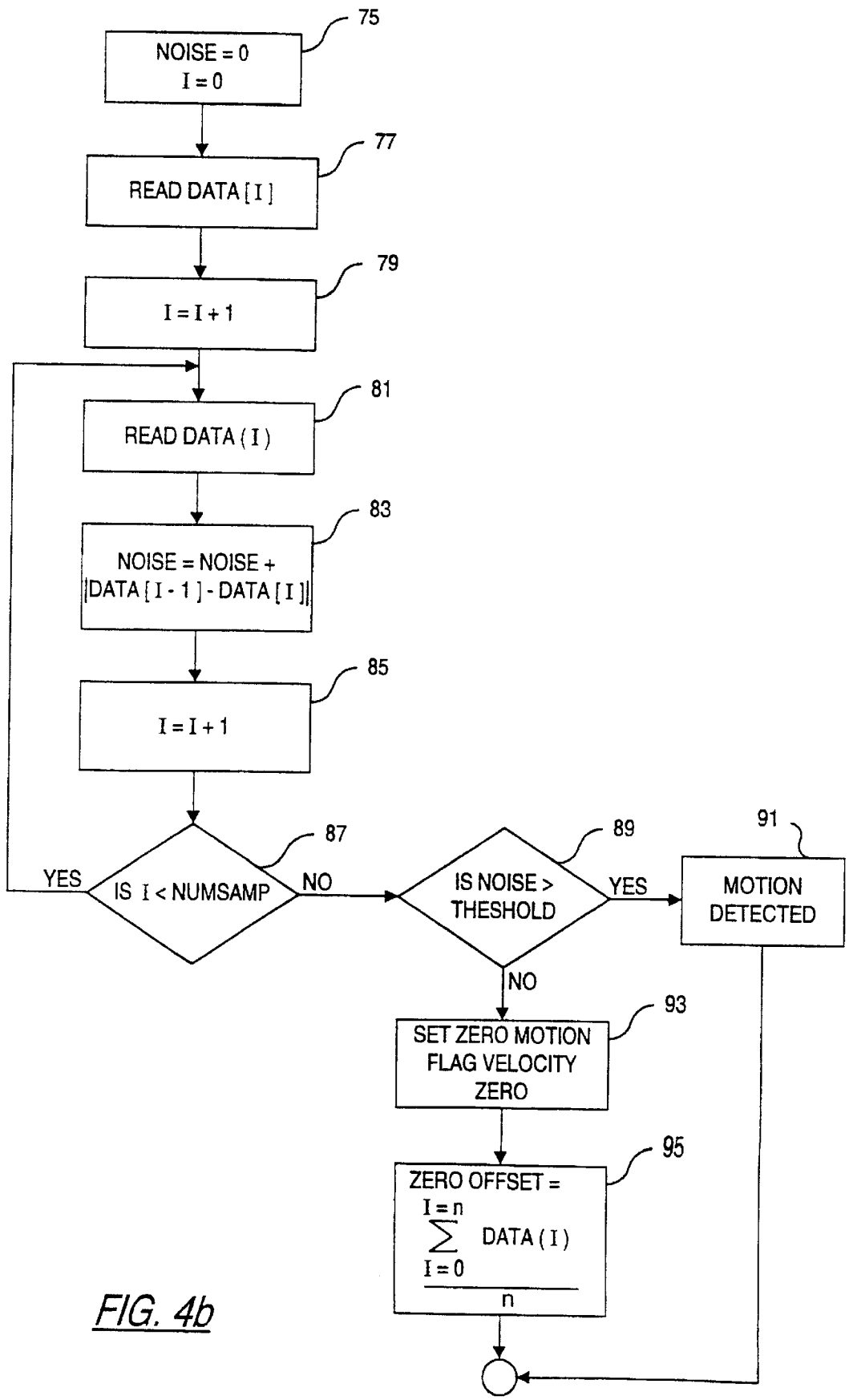

FIG. 4b shows a flowchart of a variation of the zero motion detect system. At step 75, the system intializes the variables I and NOISE to zero, and at step 77, the first value of the array is read. The counter I is incremented at step 79, and the system reads the next sample at step 81. At step 83, the system begins to accumulate the differences between consecutive samples of the motion signals. The system loops through steps 81–87 until all the samples have been read and the difference between consecutive samples accumulated in the variable NOISE. Once all the samples have been read, the system compares the variable NOISE with the threshold value at step 89. If the NOISE variable is greater than the threshold, then the system determines that motion has been detected in step 91. If the NOISE variable is less than the threshold, the system sets the zero motion flag and determines that the velocity is zero at step 93. The setting of the zero motion flag can set distance changes to zero, lock the heading and current position. Additionally, at step 95, the system calculates the zero offset for the sensor being sampled.

With regard to FIG. 4b and the high level program above, the system is described as sampling the motion signals from one sensor 64, such as one axis of the orthogonal axes accelerometer. In this particular embodiment, the motion signals for each of the orthogonal axes of the accelerometer is sampled and zero offsets for each is determined. Furthermore, zero offsets, sensor calibration or resolving of ambiguities can be accomplished for other sensors using the zero motion detection system according to the principles of the present invention. A zero motion detect system used with a vehicle navigation system is described in more detail in copending U.S. patent application Ser. No. 08/579,903, entitled "Zero Motion Detection System For Improved Vehicle Navigation System" and filed concurrently with this application.

Figure 5A:
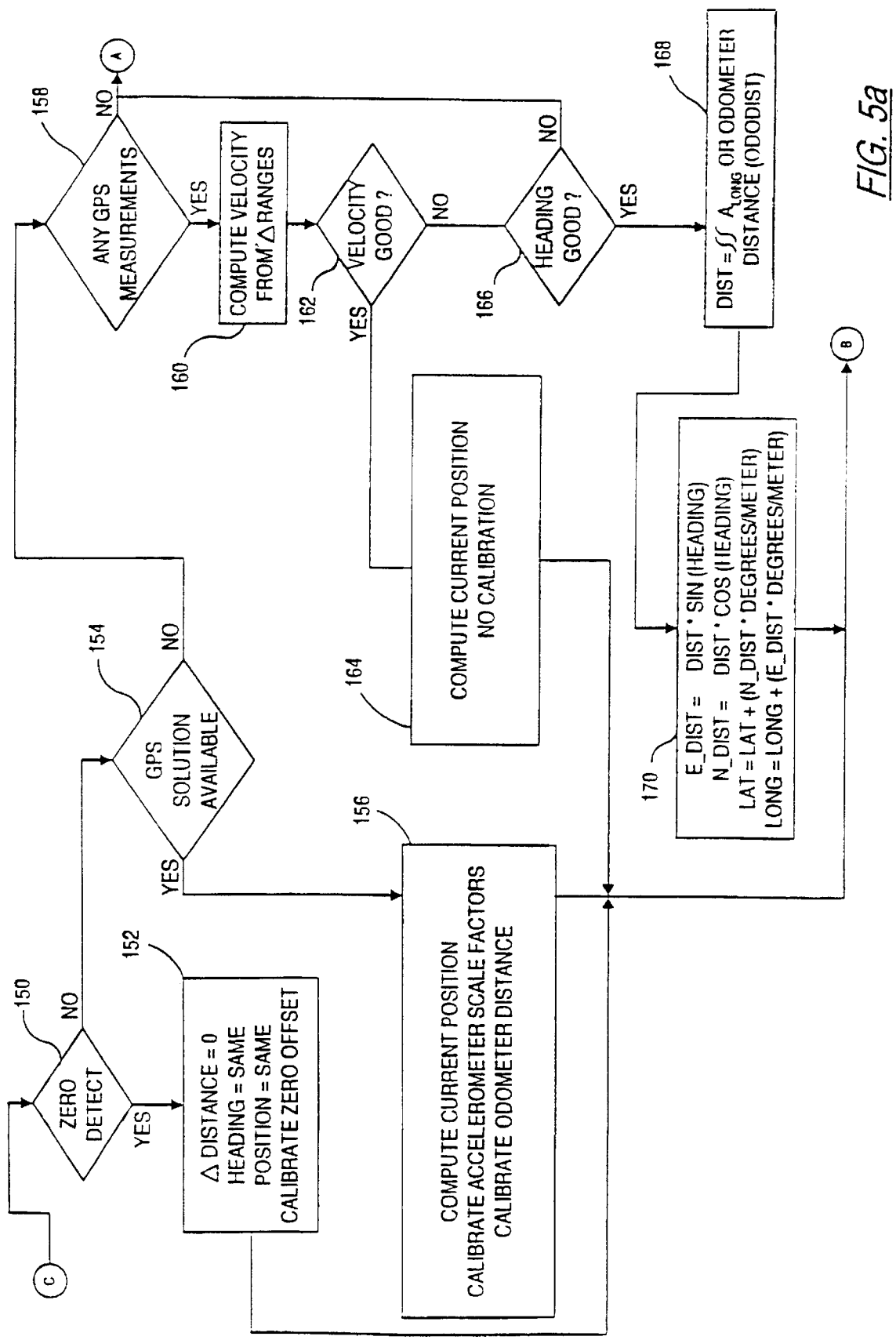
FIGS. 5a and 5b show a general flow chart of the operation of the improved vehicle navigation system of FIG. 1, and FIGS. 6a–6e show general diagrams illustrating how the improved vehicle navigation system updates the heading information with the map heading for position propagation.
Figure 5B:
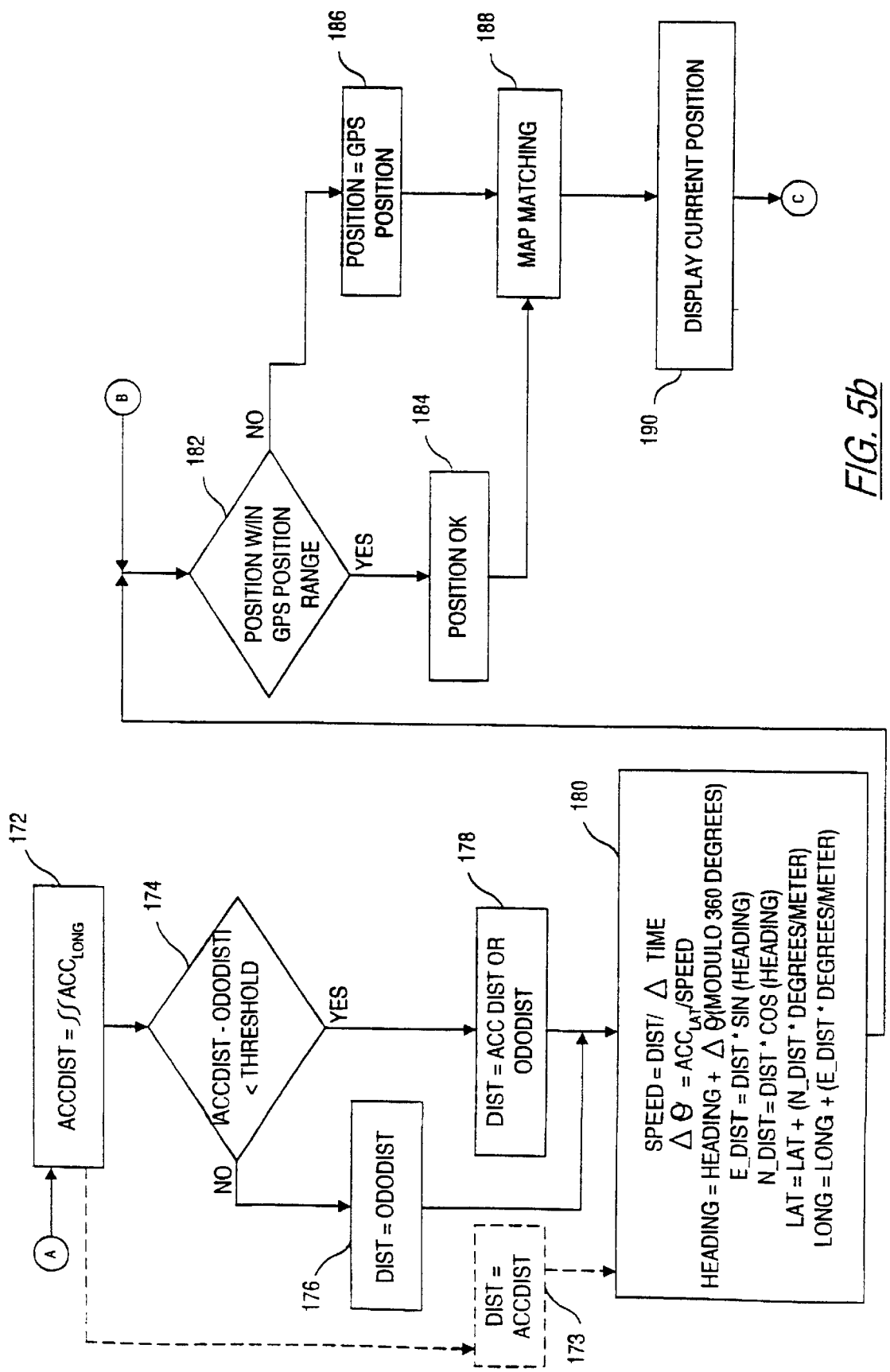

FIGS. 5a and 5b show a general flowchart illustrating how the improved vehicle navigation system 10 determines vehicle positioning from a previous position to a current position. At step 150, the improved vehicle navigation system determines if the vehicle is in a zero motion state as described above. If so, the system, at step 152, sets the change in distance to zero, locks the heading and current position, and calibrates the zero offsets.

If the system determines that the vehicle is moving, the system proceeds to step 154 to determine if a GPS solution is available. If GPS is available, the system uses the GPS velocity information to determine the current position at step 156. The use of GPS velocity information to propagate a vehicle position from a previous position to a current position is described in more detail in copending U.S. patent application Ser. No. 08/579,902, entitled "Improved Vehicle Navigation System And Method Using GPS Velocities" and filed concurrently with this application.

Using the GPS velocities for position propagation has several advantages. For example, the GPS receiver does not require calibration because of no inherent drift, and the GPS measurements can be used to calibrate the orthogonal axes accelerometer. Moreover, a cheaper accelerometer can be used because there is no need to use the sensors very often, and the sensors can be calibrated very often using the GPS measurements. The GPS receiver supports portability because it is independent of the vehicle and does not require a link to the vehicle odometer and reverse gear. At step 156, the system calibrates the sensor items, such as the accelerometer scale factors, and the system can keep the sensors well calibrated because calibrating can occur once per second (scale factors) if the vehicle speed is above 1.5 m/s.

If a full GPS solution is not available at step 154, the system checks at step 158 whether any GPS measurements are available. If so, the system computes the velocity information from the available subset of delta range measurements at step 160. If, at step 162, the velocity information is good, the system calculates current position at step 164 but without calibrating the acceleration scale factors and the odometer distance in this embodiment. If the GPS velocity is determined not to be good at step 162, the system checks the heading component of the GPS velocity at step 166. If the GPS heading component is determined to be valid, then at step 168, the change in distance is set with the odometer distance, and the heading is set with the GPS heading calculated from the GPS delta range measurements. Alternatively, an odometer is not used, and the distance is derived from the longitudinal acceleration information. With this heading and distance, the system calculates a position (lat, long) at step 170 using the equations as follows:

$$e\text{-dist} = \Delta Dist * \sin(\text{heading}) \quad (1)$$

$$n\text{-dist} = \Delta Dist * \cos(\text{heading}) \quad (2).$$

After calculating the east and north distances, the system determines the vehicle position using the equations:

$$\text{lat} = \text{lat} + (n\text{-dist} * \text{degrees/meter}) \quad (3)$$

$$\text{long} = \text{long} + (e\text{-dist} * \text{degrees/meter}) \quad (4),$$

where degrees/meter represents a conversion factor of meter to degrees, taking into consideration the shrinking member of meters in a degree of longitude as the distance from the equator increases. Calibration is not performed at this point in this embodiment.

If the system determines at step 166 that the GPS heading is not valid (GPS blockage or low velocity) or at step 158 that the GPS measurements are insufficient, the system falls back on the orthogonal axes accelerometer. GPS velocity information is subject to errors at speeds of less than 1.5 m/s, unless using a more accurate GPS system. For example, in a vehicle navigation system using DGPS, the threshold velocity is lower because of the higher accuracy of the system. As such, the vehicle navigation system proceeds to step 172 to determine the change in distance using lateral and longitudinal acceleration information from the orthogonal axes accelerometer(s). At step 174, the system compares the longitudinal distance from the accelerometer with the odometer distance, and if the difference between them exceeds a threshold value, the odometer distance is used at step 176. If the difference is less than the threshold, then the accelerometer distance or the odometer distance can be used for the distance at step 178. According to some aspects of the present invention, the system could fall back on only the orthogonal axes accelerometer(s). As shown in dashed step 173, if an odometer is not used, the distance is derived from the longitudinal acceleration information.

Once the change in distance is determined, the system calculates the position at step 180 using the following equations to determine heading as follows:

$$\text{speed} = \Delta Dist / \Delta t \quad (5)$$

$$\Delta \theta = a_{lat} \text{ (lateral acceleration)/longitudinal speed} \quad (6)$$

$$\text{heading} = \text{heading} + \Delta \theta (\text{modulo } 360°) \quad (7).$$

After determining heading, the system uses equations 1 and 2 to determine the east and north distances and equations 3 and 4 to determine position.

After determining the initial current position at step 156, 164, 170 or 180, the system proceeds to step 182 where the current position is compared with the GPS position. If the current position is within an acceptable distance from the GPS position, the system determines that the current position is valid at step 184. If not, the system replaces the current position with the GPS position at step 186. At this point, the system sends to a map matching step 188 a position and velocity, which has speed and heading components.

The map matching block 188 sends back a map matched current position, distance, heading, FOMs for each and calibration data. In this embodiment, the map matching block 188 interrogates the map database 30 (FIG. 1) to obtain a heading of the mapped path segment which the vehicle is determined to be traversing. The map matching block 188 updates the heading associated with the current position, which was based on GPS and/or sensor calculations, to obtain an updated current position if the difference between the current heading and the map heading is written within a threshold. As such, the map matching block 188 uses the map heading to update the heading based on the GPS velocity information, the heading based on the GPS position information of step 186, the heading from the sensors, or the heading based on a current position determined through a combination of GPS and sensor information, such as an embodiment with all raw inputs going into a Kalman filter.

Figure 6A:
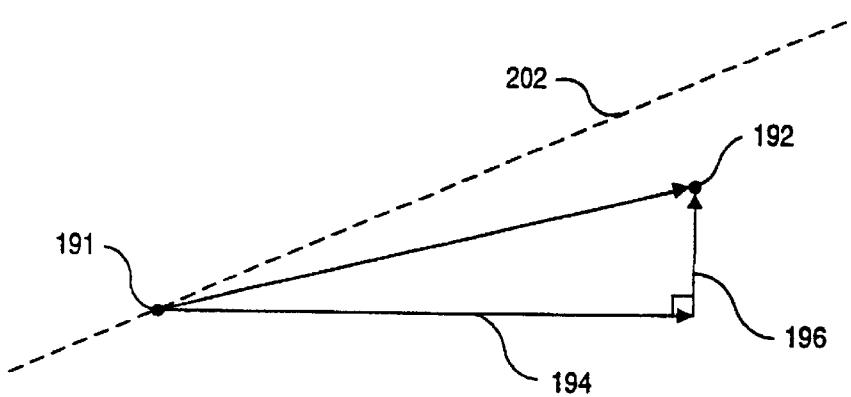
Figure 6B:
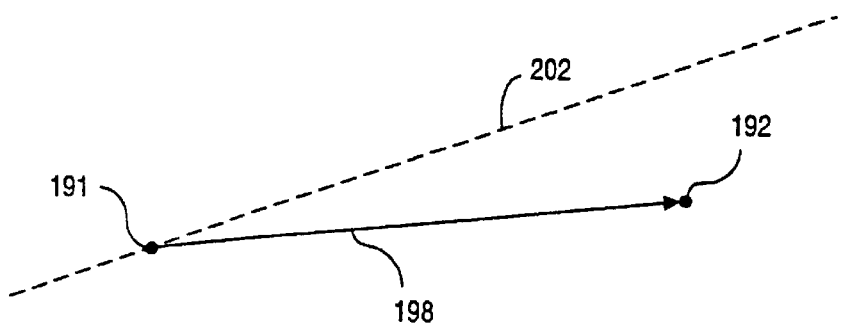

As shown in FIG. 6a, this particular embodiment uses GPS velocity information to propagate a previous position 191 to a current position 192 (by adding displacements 194 and 196 obtained from the velocity information (integrated) to the previous position). In FIG. 6b, if GPS information is not available, the vehicle navigation system uses sensor information to propagate the previous position 191 to current position 192 using heading and distance 198. If the difference between the GPS heading (or current heading from the sensors if GPS is not used) and the map heading is within a threshold, then the map heading is used as the heading for position propagation. The vehicle navigation system 10 can accomplish this in alternative ways. For example, as shown in FIG. 6c using GPS velocities, the vehicle navigation system 10 rotates the GPS velocity vector 200 to align with the map heading 202 if the GPS and map headings are within the threshold and integrates the rotated GPS velocity vector 204 to obtain the displacements. As shown, the updated current position 206 is obtained by applying orthogonal displacements 208 and 210 to the previous position 191.

Errors usually involve heading determinations due to drift errors in gyro or compass. Displacement is easy to test and one of the most accurate components in the GPS measurements and also in the sensors, so the system uses the entire displacements from the GPS velocity information or the dead reckoning sensors, such as the accelerometers. Thus, the improved vehicle navigation system can use low cost sensors which are less sensitive because heading can be corrected with map heading.

Figure 6D:
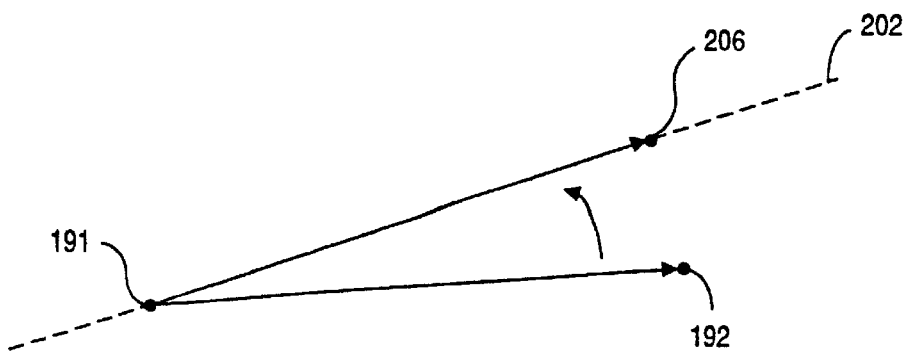
Figure 6C:
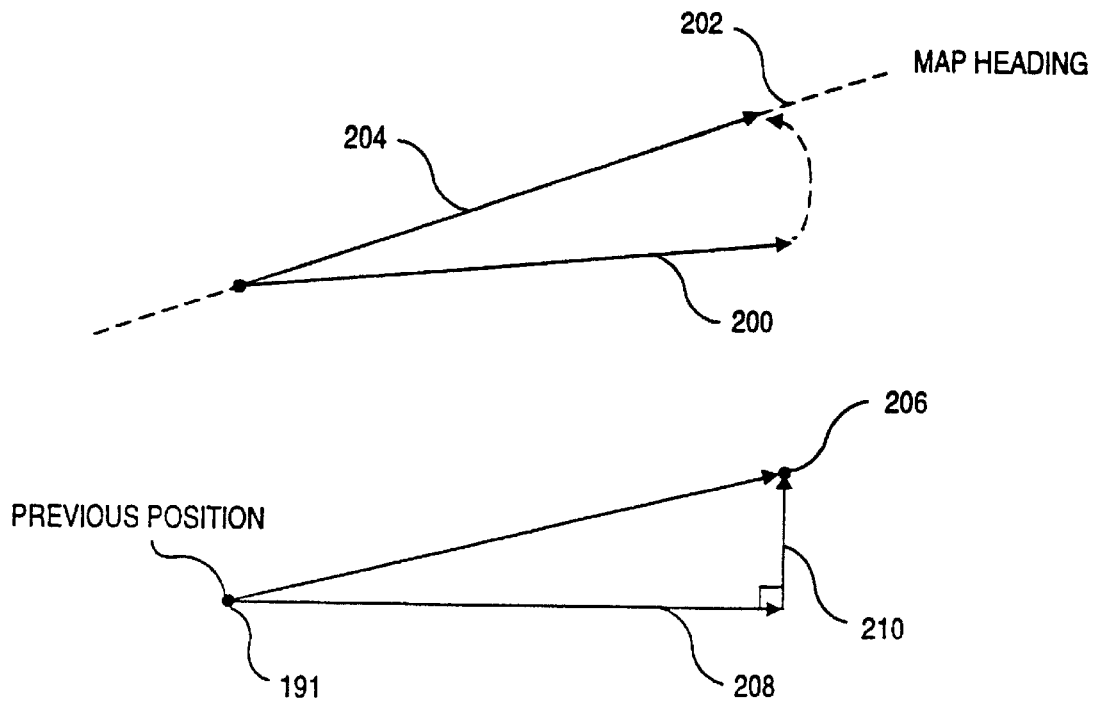
Figure 6E:
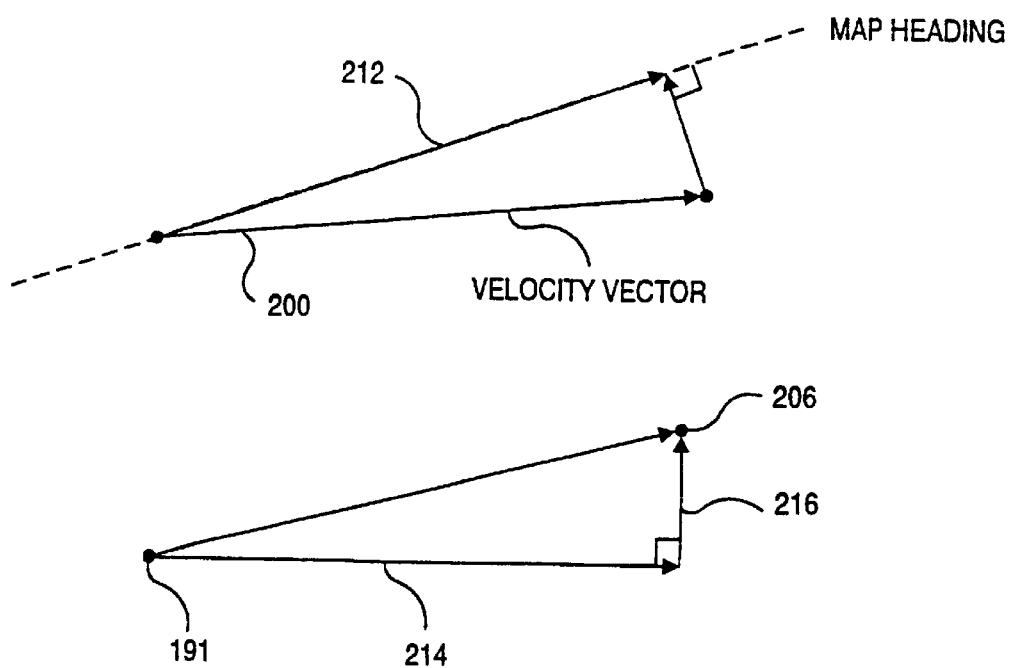

As shown in FIG. 6d, if the vehicle navigation system uses sensor information to propagate the previous position 191 to current position 192 using heading and distance 198, the map heading 202 can be used as the heading for position propagation to the updated current position 206. FIG. 6e shows an alternative way of updating the GPS heading and thus the current position by projecting the velocity vector 200 to align with the map heading 202 and integrating the projected velocity 212 to obtain displacements 214 and 216. The system 10 obtains the updated current position 192 by applying the displacements 214 and 216 to the previous position 191. The use of map heading to update the information obtained from the non-GPS sensors or a combination of GPS and sensors can be accomplished in a similar manner as would be understood by one of skill in the art.

The improved vehicle navigation system uses the GPS information for positioning and a high frequency of sensor calibration because GPS information is available a great deal of the time. When GPS is available, the improved vehicle navigation system can use the map matching block 188 to provide an overall check on the current position and to provide position and heading correction data which is used if map matching 188 determines it is highly reliable. In this particular embodiment, the current position (w/o map matching) is determined once per second. If the vehicle has travelled more than 15 meters since the last call to map matching 188, then the current position is passed to map matching 188. If the vehicle is travelling at high speed, the system will go to map matching 88 at each current position determination at the maximum rate of once per second. When GPS is not available or unreliable, the improved vehicle navigation system has well calibrated accelerometers to rely on, and the improved vehicle navigation system can rely more on the information from the map matching block 188 for positioning and sensor calibration.

Thus, the improved vehicle navigation system provides several significant advantages, such as flexibility, modularity, and accuracy at a cheaper cost because GPS information can be used to calibrate accelerometers more often and updating can be performed at a complete stop. These advantages occur because the system relies heavily on GPS velocity information to propagate vehicle position and maintain the accelerometer calibrated.

The principles of the present invention, which have been disclosed by way of the above examples and discussion, can be implemented using various navigation system configurations and sensors. The improved vehicle navigation system, for instance, can be implemented without using an odometer connection and obtaining distance information from the accelerometer inputs when GPS is not available to improve portability and installation costs. Moreover, the improved vehicle navigation system can obtain dead reckoning information from GPS signals when a full set of GPS measurements is available, and use its accelerometers when anything less than a full set of GPS signals is available. Those skilled in the art will readily recognize that these and various other modifications and changes may be made to the present invention without strictly following the exemplary application illustrated and described herein and without departing from the true spirit and scope of the present invention, which is set forth in the following claims.

What is claimed is:

1. A vehicle navigation system (10) comprising:
   an orthogonal axes accelerometer (20) provides longitudinal acceleration information and lateral acceleration information; and
   said vehicle navigation system (10) derives longitudinal speed from said longitudinal acceleration information and derives heading change from said lateral acceleration information and said longitudinal speed and uses said heading change and said longitudinal acceleration information to propagate a previous position to a current position.

2. The system of claim 1 wherein said vehicle navigation system (10) assigns an axis of said orthogonal axes accelerometer to a particular axis by comparing the difference between a first acceleration information and second acceleration information to a predetermined threshold and by comparing said first and second acceleration information to acceleration measurements derived from at least one other sensor in said particular axis, and said system assigns said particular axis to said axis of said accelerometer having acceleration information closest to said acceleration information derived from at least one other sensor.

3. The system of claim 1 wherein said vehicle navigation system (10) determines lateral and longitudinal calibration accelerations from GPS velocities, said system calibrates said lateral and longitudinal acceleration information with said latitudinal and longitudinal calibration accelerations.

4. The system of claims 3 wherein said system updates scale factors for said lateral and longitudinal acceleration information using said latitudinal and longitudinal calibration accelerations.

5. The vehicle navigation system (10) of claim 2 wherein said vehicle navigation system compares the difference between said first acceleration information and said second acceleration information to a predetermined threshold to ensure the accelerations are different enough for valid axis assignment.

6. The vehicle navigation system (10) of claim 1 wherein said orthogonal axes accelerometer further provides vertical acceleration information and said vehicle navigation system uses said vertical acceleration information to calibrate said longitudinal and lateral acceleration information.

7. A method of propagating a previous position to a current position in a vehicle navigation system (10), said method including the steps of:
   providing longitudinal acceleration information;
   providing lateral acceleration information;
   deriving longitudinal speed from said longitudinal acceleration information;
   deriving heading change from said lateral acceleration information and said longitudinal speed; and
   using said heading change and said longitudinal acceleration to propagate a previous position to a current position.

8. The method of claim 7 further including the steps of:
   providing vertical acceleration information; and
   using said vertical information to calibrate said longitudinal and lateral acceleration information.

9. The method of claim 7 further including, for orienting acceleration information to a particular axis, the steps of:
   comparing the difference between first acceleration information and second acceleration information to a predetermined threshold:
   comparing said first and second acceleration information to acceleration measurements derived from at least one other sensor in said particular axis; and
   assigning said particular axis to acceleration information closest to said acceleration information derived from at least one other sensor based upon said step of comparing.

10. The method of claim 7 further including the steps of:
    determining latitudinal and longitudinal calibration accelerations from GPS velocities; and calibrating said lateral and longitudinal acceleration information with said latitudinal and longitudinal calibration accelerations.

11. The method of claim 10 further including the steps of:
update scale factors for said lateral and longitudinal acceleration information using said latitudinal and longitudinal calibration accelerations.

12. A vehicle navigation system comprising:
an orthogonal axes accelerometer providing longitudinal acceleration information and lateral acceleration information; and
said vehicle navigation system assigning an axis of said orthogonal axes accelerometer to a particular axis by comparing first and second acceleration information to acceleration measurements derived from at least one other sensor in said particular axis, and said system assigning said particular axis to said axis of said accelerometer having acceleration information closest to said acceleration information derived from at least one other sensor.

13. The vehicle navigation system of claim 12 wherein said vehicle navigation system compares the difference between said first acceleration information and said second acceleration information to a predetermined threshold to ensure the accelerations are different enough for valid axis assignment.

14. A vehicle navigation system comprising:
an orthogonal axes accelerometer providing longitudinal acceleration information and lateral acceleration information; and
said vehicle navigation system determining lateral and longitudinal calibration accelerations from GPS velocities, said system calibrating said lateral and longitudinal acceleration information with said latitudinal and longitudinal calibration accelerations.

15. The system of claim 14 wherein said system updates scale factors for said lateral and longitudinal acceleration information using said lateral and longitudinal calibration accelerations.

16. A vehicle navigation system comprising:
an orthogonal axes accelerometer providing first acceleration information along a first axis of the accelerometer and second acceleration information along a second axis of said accelerometer, said accelerometer installed in a vehicle in an unknown orientation relative to the vehicle; and
said vehicle navigation system determining the orientation of said accelerometer relative to the vehicle based upon said first acceleration information and said second acceleration information.

17. The vehicle navigation system of claim 16 wherein said vehicle navigation system compares said first and second acceleration information to acceleration measurements derived from at least one other sensor in a particular axis, and said system assigning said particular axis to said axis of said accelerometer having acceleration information closest to said acceleration information derived from at least one other sensor, said vehicle navigation system propagating a previous position to a current position based upon said first and second acceleration information.

18. A method of propagating a previous position to a current position in a vehicle navigation system, said method including the steps of:
providing longitudinal acceleration information;
providing lateral acceleration information;
deriving longitudinal speed from said longitudinal acceleration information;
deriving heading change from said lateral acceleration information and said longitudinal speed; and
using said heading change and said longitudinal acceleration to propagate a previous position to a current position;
determining latitudinal and longitudinal calibration accelerations from GPS velocities; and
calibrating said lateral and longitudinal acceleration information with said latitudinal and longitudinal calibration accelerations.

19. A method for propagating a previous position to a current position in a vehicle navigation system, said method including the steps of:
a) receiving a plurality of signals from an inertial sensor mounted in a vehicle in an unknown orientation relative to the vehicle;
b) determining said orientation of the inertial sensor relative to the vehicle based upon the plurality of signals; and
c) propagating a previous position to a current position based upon the plurality of signals.

20. The method of claim 19 wherein said step b) further includes the step of comparing the plurality of signals to acceleration measurements from at least one other sensor.

* * * * *